(12) United States Patent
Doisneau et al.

(10) Patent No.: US 10,040,976 B2
(45) Date of Patent: Aug. 7, 2018

(54) AQUEOUS ADHESIVE COMPOSITION BASED ON POLYALDEHYDE AND PHLOROGLUCINOL

(75) Inventors: David Doisneau, Clermont-Ferrand (FR); Hélène Decorps, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 751 days.

(21) Appl. No.: 14/235,517

(22) PCT Filed: Jul. 19, 2012

(86) PCT No.: PCT/EP2012/064202
§ 371 (c)(1),
(2), (4) Date: Apr. 29, 2014

(87) PCT Pub. No.: WO2013/017422
PCT Pub. Date: Feb. 7, 2013

(65) Prior Publication Data
US 2014/0235125 A1 Aug. 21, 2014

(30) Foreign Application Priority Data

Aug. 4, 2011 (FR) ...................................... 11 57156

(51) Int. Cl.
*C09J 161/12* (2006.01)
*C09J 7/04* (2006.01)
(Continued)

(52) U.S. Cl.
CPC ................. *C09J 7/041* (2013.01); *C08L 7/02* (2013.01); *C09J 7/21* (2018.01); *C09J 7/30* (2018.01);
(Continued)

(58) Field of Classification Search
CPC ..................... C08L 21/02; C08L 61/06; Y10T 428/249921; Y10T 442/2738
(Continued)

(56) References Cited

U.S. PATENT DOCUMENTS 2,561,215 A    7/1951  Mighton ......................... 154/43
2,566,851 A    9/1951  Novotny et al. ................. 260/56
(Continued)

FOREIGN PATENT DOCUMENTS

| FR | 929407 A | 12/1947 |
| FR | 2 485 435 A1 | 12/1981 |
| WO | WO 2005/042278 A2 | 5/2005 |

OTHER PUBLICATIONS

U.S. Appl. No. 14/235,514, filed Jul. 19, 2012, Doisneau.
U.S. Appl. No. 14/235,521, filed Jul. 19, 2012, Doisneau.

*Primary Examiner* — Vincent A Tatesure
(74) *Attorney, Agent, or Firm* — Fitzpatrick, Cella, Harper & Scinto

(57) ABSTRACT

An aqueous adhesive composition includes: a phenol/aldehyde resin; and an unsaturated elastomer latex. The phenol/aldehyde resin is based on at least: an aromatic polyaldehyde bearing at least two aldehyde functional groups and including at least one aromatic nucleus; and phloroglucinol. The adhesive composition is useable to make a textile material adhere to a crosslinkable rubber composition, and may be used as an advantageous alternative to a formaldehyde-based RFL adhesive.

24 Claims, 1 Drawing Sheet

(51) Int. Cl.
*C09J 107/02* (2006.01)
*C09J 121/02* (2006.01)
*C09J 109/10* (2006.01)
*C09J 7/30* (2018.01)
*C09J 7/21* (2018.01)
*C08L 7/02* (2006.01)
C08L 21/02 (2006.01)

(52) U.S. Cl.
CPC .......... *C09J 107/02* (2013.01); *C09J 109/10* (2013.01); *C09J 121/02* (2013.01); *C09J 161/12* (2013.01); *C08L 21/02* (2013.01); *C08L 2666/16* (2013.01); *Y10T 428/249921* (2015.04); *Y10T 442/2738* (2015.04)

(58) Field of Classification Search
USPC .......................................... 442/149; 428/221
See application file for complete search history.

(56) References Cited

U.S. PATENT DOCUMENTS

| | | | | |
|---|---|---|---|---|
| 2,902,470 A | * | 9/1959 | Kress | C08G 8/28 428/526 |
| 3,817,778 A | | 6/1974 | Wright | 117/128.4 |
| 4,390,683 A | | 6/1983 | Yatsu et al. | 528/194 |
| 4,461,859 A | | 7/1984 | Girgis | 524/62 |
| 8,247,490 B1 | | 8/2012 | Li | 524/510 |
| 2004/0147712 A1 | * | 7/2004 | Durairaj | C08G 8/04 528/106 |
| 2012/0211139 A1 | | 8/2012 | Li | 152/537 |

\* cited by examiner

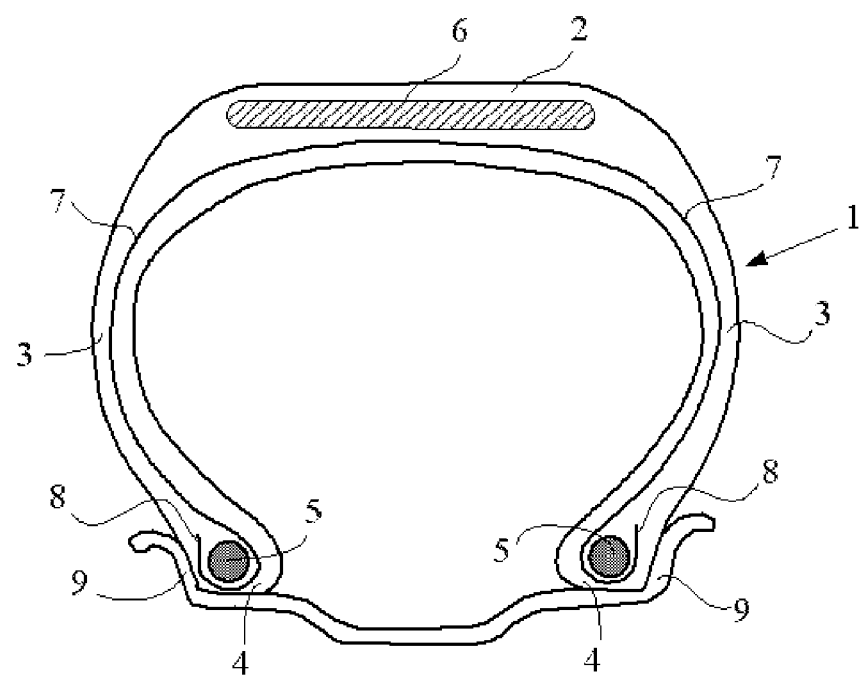

AQUEOUS ADHESIVE COMPOSITION BASED ON POLYALDEHYDE AND PHLOROGLUCINOL

FIELD OF THE INVENTION

The field of the present invention is that of textile materials and adhesive compositions or "adhesives" intended to make such textile materials adhere to unsaturated rubber matrices, such as those commonly used in rubber articles or semi-finished products.

The present invention relates more particularly to textile materials sized with adhesive layers based on a phenol/aldehyde resin, in particular to sized textile materials capable of reinforcing tyre structures.

RELATED ART

It has been known for a very long time to make textile materials adhere to diene elastomer compositions by virtue of the use of adhesives known under the name "RFL" (for resorcinol/formaldehyde latex), for example for the adhesive bonding of rubber compositions to textile cords made of polyester or polyamide, such as those normally used in tyres (see, for example, U.S. Pat. No. 2,561,215 and U.S. Pat. No. 3,817,778). These RFL adhesives comprise, in a well-known way, a thermosetting phenolic resin, obtained by the condensation of resorcinol with formaldehyde, and one or more latexes of diene rubber in aqueous solution.

Experience shows that the above RFL adhesives confer excellent adhesion of textile materials to crosslinkable rubber compositions.

However, these RFL adhesives are not without disadvantage; in particular they comprise formaldehyde as base substance, which substance it is desirable in the long run to reduce in, indeed even to eliminate from, adhesive compositions because of the recent changes in European regulations regarding this type of compound.

Thus, the designers of rubber articles, in particular tyre manufacturers, today have the objective of finding novel adhesive systems or novel textile materials which make it possible to overcome the abovementioned disadvantage.

BRIEF DESCRIPTION OF EMBODIMENTS OF THE INVENTION

In point of fact, during their research studies, the Applicant Companies have discovered an aqueous adhesive composition not using formaldehyde which makes it possible to meet the above objective.

Thus, a first subject-matter of the invention relates to an aqueous adhesive composition comprising at least: on the one hand, A) a phenol/aldehyde resin and, on the other hand, B) an unsaturated elastomer latex, characterized in that the phenol/aldehyde resin is based on at least: one aromatic polyaldehyde bearing at least two aldehyde functional groups, comprising at least one aromatic nucleus, and phloroglucinol.

Another subject-matter of the invention relates to the use of the aqueous adhesive composition according to the invention to make a textile material adhere, by curing, to a crosslinkable rubber composition, and also to a textile material, at least a portion of which is coated with an adhesive layer, characterized in that the said layer comprises an aqueous adhesive composition according to the invention.

The invention also relates to a process for the manufacture of a textile material according to the invention, characterized in that it comprises at least one stage of deposition, on a starting textile material, of an adhesive composition in accordance with the invention.

The invention also relates to the use of the textile material of the invention as reinforcing element for rubber articles or semi-finished products, in particular tyres, especially those intended to equip motor vehicles of passenger type, SUVs ("Sport Utility Vehicles"), two-wheel vehicles (in particular bicycles and motorcycles), aircraft, as for industrial vehicles chosen from vans, heavy-duty vehicles, that is to say, underground trains, buses, heavy road transport vehicles (lorries, tractors, trailers) or off-road vehicles, such as heavy agricultural vehicles or earthmoving equipment, or other transportation or handling vehicles.

The invention also relates, per se, to any rubber composite (article or semi-finished product), in particular any tyre, before and after curing (for final crosslinking or vulcanization), comprising a textile material according to the invention.

BRIEF DESCRIPTION OF THE DRAWINGS

The invention and its advantages will be easily understood in the light of the description and implementational examples, which follow, considered in conjunction with the sole FIGURE attached hereto, which schematically shows a radial section of a tyre according to an embodiment of the invention.

DETAILED DESCRIPTION OF EMBODIMENTS OF THE INVENTION

I—Formulation of the Aqueous Adhesive Composition

In the present description, unless expressly indicated otherwise, all the percentages (%) shown are % by weight.

"Diene" elastomer (or, without distinction, rubber) is understood to mean an elastomer resulting at least in part (that is to say, a homopolymer or a copolymer) from diene monomer(s) (i.e., monomers bearing two conjugated or non-conjugated carbon-carbon double bonds). "Isoprene elastomer" is understood to mean an isoprene homopolymer or copolymer, in other words a diene elastomer selected from the group consisting of natural rubber (NR), synthetic polyisoprenes (IRs), various isoprene copolymers and the mixtures of these elastomers.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The expression "composition based on" should, of course, be understood as meaning a composition comprising the mixture and/or the reaction product of the various base constituents used for this composition, it being possible for some of them to be intended to react or capable of reacting with one another or with their immediate chemical surroundings, at least partly, during the various phases of manufacture of the composition, of the textile material or of the composites or finished articles comprising such composites, in particular during a curing stage.

The aqueous adhesive composition according to the invention thus comprises at least, on the one hand, A) a (at least one) phenol/aldehyde resin and, on the other hand, B) a (at least one) unsaturated elastomer latex; this phenol/aldehyde resin is, for its part, based on at least one (that is to say, one or more) aromatic polyaldehyde and a specific polyphenol, phloroglucinol, which constituents will be described in detail below.

I.1—Aromatic Polyaldehyde

The first essential constituent of the phenol/aldehyde resin is an aromatic polyaldehyde bearing at least two aldehyde functional groups, comprising at least one aromatic nucleus. According to a preferred embodiment, it is the aromatic nucleus which bears the aldehyde functional groups, it being possible for the latter to be in the ortho, meta or para position on the aromatic nucleus.

Preferably, the aromatic nucleus of the polyaldehyde is a benzene nucleus. More preferably, this polyaldehyde is selected from the group consisting of 1,2-benzenedicarboxaldehyde, 1,3-benzenedicarboxaldehyde, 1,4-benzenedicarboxaldehyde, 2-hydroxybenzene-1,3,5-tricarbaldehyde and the mixtures of these compounds.

More preferably still, the aromatic polyaldehyde used is 1,4-benzenedicarboxaldehyde, also called terephthaldehyde, as a reminder of expanded chemical formula:

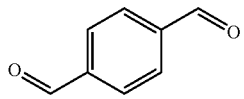

I.2—Phloroglucinol

The second essential constituent of the phenol/aldehyde resin is phloroglucinol, which is a polyphenol of expanded formula:

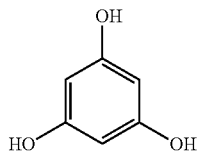

Phloroglucinol comprises just one aromatic nucleus; the latter bears three hydroxyl functional groups in the meta position with respect to one another, the remainder of the aromatic nucleus being by definition unsubstituted; this is understood to mean that the other carbon atoms of the remainder of the aromatic nucleus (those other than the carbon atoms bearing hydroxyl functional groups) bear a simple hydrogen atom.

I.3—Unsaturated Elastomer Latex

It should be remembered that a latex is a stable dispersion of microparticles of elastomer(s) in suspension in an aqueous solution.

Unsaturated (that is to say, bearing carbon-carbon double bonds) elastomer latexes, in particular diene elastomer latexes, are well known to a person skilled in the art. They constitute in particular the elastomeric base of the RFL adhesives described in the introduction to the present account.

In accordance with the invention, the unsaturated elastomer of the latex is preferably a diene elastomer, more preferably a diene elastomer selected from the group consisting of polybutadienes, butadiene copolymers, polyisoprenes, isoprene copolymers and the mixtures of these elastomers. It is more preferably still selected from the group consisting of butadiene copolymers, vinylpyridine/styrene/butadiene terpolymers, natural rubber and the mixtures of these elastomers.

I.4—Additives—Manufacture of the Aqueous Adhesive Composition

The aqueous adhesive composition in accordance with the invention and/or its phenol/aldehyde resin and/or its starting unsaturated elastomer latex can, of course, comprise all or some of the additives normal for aqueous adhesive compositions, such as those used in conventional RFL adhesives; mention will be made, for example, of bases, such as aqueous ammonia, sodium hydroxide, potassium hydroxide or ammonium hydroxide, colourants, fillers, such as carbon black or silica, antioxidants or other stabilizers.

Typically, during a first manufacturing stage, the resin itself is prepared by gradually mixing the phloroglucinol and the aromatic polyaldehyde in a basic solvent, such as an aqueous sodium hydroxide solution, preferably having a pH of between 9 and 13, more preferably between 10 and 12. The combined constituents are mixed with stirring for a time which can vary according to the temperature used and the specific composition targeted, for example for a period of time which can vary between 1 min and 6 h, at a temperature of between 20° C. and 90° C., preferably between 20° C. and 60° C.

The ratio by weight of phloroglucinol to polyaldehyde is preferably between 0.1 and 3, more preferably between 0.25 and 2.

The phenol/aldehyde resin, thus pre-condensed, is generally diluted in water before being added to the unsaturated elastomer latex or latexes (if there are several), in order to form the aqueous adhesive composition of the invention, according to a general procedure which is well-known to a person skilled in the art in the field of RFL adhesives.

For example, the constituents of the adhesive composition are added in the following order: the water, possible water-soluble additives (for example aqueous ammonia), the latex or latexes (order unimportant), the phenol/aldehyde resin (diluted). The combination is mixed with stirring for 1 to 30 min, for example at 20° C.

During a final manufacturing stage, the aqueous adhesive composition is generally stored at ambient temperature (23° C.) for a maturing time which can typically vary from 1 to several hours, indeed even several days, before it is finally used.

In the final adhesive composition thus prepared, the content of phenol/aldehyde resin as dry matter preferably represents between 5% and 60% by weight, more preferably between 10% and 30% by weight, of the adhesive composition dry matter.

For its part, the content of unsaturated elastomer (that is to say, the dry matter of the latex or latexes) is preferably between 40% and 95% by weight, more preferably between 70% and 90% by weight, of the dry matter of the adhesive composition.

The ratio by weight of the resin dry matter to the latex dry matter is preferably between 0.1 and 2.0, more preferably between 0.15 and 1.0.

The water content of the aqueous adhesive composition of the invention is preferably between 60% and 90%, more preferably between 60% and 85%.

II—Textile Material and Composite of the Invention

As indicated above, the present invention also relates to the use of the aqueous adhesive composition described above for the adhesive bonding of any textile material to an unsaturated rubber composition, for formation of a reinforced rubber composite of such a material, and also, as such, to the textile material, at least a portion of which is coated with an adhesive composition according to the invention.

II.1—Definitions; Examples of Textile Materials

In the present patent application, by definition, "textile" or "textile material" is understood to mean, in a way well known to a person skilled in the art, any material made of a substance other than a metallic substance, whether natural or synthetic, which is capable of being transformed into thread, fibre or film by any appropriate transformation process. Mention may be made, for example, without the examples below being limiting, of a polymer spinning process, such as, for example, melt spinning, solution spinning or gel spinning This textile material can consist of a thread or fibre, a ribbon or film, or also of a fabric produced from threads or fibres, for example a woven fabric with warp threads and weft threads, or else a twill fabric with cross threads.

Preferably, this textile material of the invention is selected from the group consisting of films, monofilaments (or individual threads), multifilament fibres, assemblies of such threads or fibres, and mixtures of such materials. It is more particularly a monofilament, a multifilament fibre or a folded yarn.

The term "thread" or "fibre" is generally understood to mean any elongate element of great length relative to its cross section, whatever the shape, for example circular, oblong, rectangular, square, or even flat, of this cross section, it being possible for this thread to be straight or not straight, for example twisted or wavy. The largest dimension of its cross section is preferably less than 5 mm, more preferably less than 3 mm.

This thread or fibre may take any known form. For example, it may be an individual monofilament of large diameter (for example and preferably equal to or greater than 50 µm), a multifilament fibre (consisting of a plurality of individual filaments of small diameter, typically less than 30 µm), a textile folded yarn or cord formed from several textile fibres or monofilaments twisted or cabled together, or else an assembly, group or row of threads or fibres, such as, for example, a band or strip comprising several of these monofilaments, fibres, folded yarns or cords grouped together, for example aligned along a main direction, whether straight or not.

The term "film" or "ribbon" is generally understood to mean an elongate element of great length relative to its cross section, the cross section of which has an aspect ratio (width to thickness) of greater than 5, preferably of greater than 10, and the width of which is preferably at least equal to 3 mm, more preferably at least equal to 5 mm.

The aqueous adhesive composition of the invention can be applied to any textile material as described above and capable of reinforcing rubber articles, such as tyres, including textile materials made of organic or polymeric substance, such as made of inorganic substance.

Mention will be made, as examples of inorganic substances, of glass or carbon.

The invention is preferably implemented with materials made of polymeric substance, of both the thermoplastic and non-thermoplastic type.

Mention will be made, as examples of polymeric substances of the non-thermoplastic type, for example, of aramid (aromatic polyamide) and cellulose, both natural and artificial, such as cotton, rayon, flax or hemp.

Mention will preferably be made, as examples of polymeric substances of the thermoplastic type, of aliphatic polyamides and of polyesters. Mention may in particular be made, among the aliphatic polyamides, of the polyamides PA-4,6, PA-6, PA-6,6, PA-11 or PA-12. Mention may be made, among the polyesters, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate).

II.2—Manufacture of the Textile Material and of the Composite

The textile material of the invention can be prepared according to a sizing process, characterized in that it comprises at least one stage of deposition, on the starting (initial) textile material, of an adhesive composition in accordance with the invention.

The stage of deposition of the adhesive composition on the initial textile material (starting textile material) can be carried out according to any appropriate method, in particular by any known coating technique, such as, for example, spraying, impregnation by dipping, forward progression in a bath or other equivalent technique for the deposition of a thin or ultra-thin film of adhesive, or also by a combination of one or more of these techniques.

The weight of dry matter of the aqueous adhesive composition deposited on one kilogram of textile material is preferably between 5 and 100 g, more preferably between 30 and 70 g and more preferably still between 40 and 60 g.

The invention also applies to the cases where the starting textile material has been precoated with an adhesion primer, such as those commonly used by a person skilled in the art for the pre-sizing of certain textile fibres (e.g., PET or aramid fibres). The fibres, thus precoated, are then subjected to a subsequent and definitive sizing with the aqueous adhesive composition according to the invention.

After the stage, described above, of deposition of the adhesive composition, the sized material is subjected to a first heat treatment, targeted at removing any solvent or water, at a temperature of preferably between 110° C. and 260° C., more preferably between 130° C. and 250° C., for example by passing through a tunnel oven, typically with a length of several meters, such as those commonly used for the heat treatment after sizing of the textile materials with an RFL adhesive. Thus, the textile material can, for example, be obtained by drying, that is to say, after a heat treatment targeted at removing the water from a textile material, at least a portion of which is coated with an adhesive layer comprising an adhesive composition according to the invention.

The anhydrous material thus obtained is then subjected to a second heat treatment in order to terminate the crosslinking of the adhesive composition, preferably carried out in air in a tunnel oven as described above. The treatment temperature is preferably between 150° C. and 350° C. The treatment times are from a few seconds to a few minutes, according to the circumstances (for example, between 10 s and 10 min).

Where appropriate, a person skilled in the art will know how to adjust the temperature and the duration of the heat treatment above according to the particular operating conditions of the invention, especially according to the exact nature of the textile material manufactured, in particular depending on whether the treatment is on monofilaments, multifilament fibres, folded yarns consisting of several fibres twisted together, or films. In particular, a person skilled in the art will have the advantage of varying the treatment temperature and treatment time so as to find, by successive approximations, the operating conditions giving the best adhesion results for each particular embodiment of the invention.

Thus sized, the textile material of the invention is preferably intended to adhere to an unsaturated rubber composition, such as a diene rubber, in order to form a reinforced rubber composite which constitutes another subject-matter of the invention.

This rubber composite of the invention can be prepared according to a process comprising at least the following stages:
- during a first stage, combining at least a portion of the textile material according to the invention with an unsaturated (crosslinkable) rubber composition, in order to form a rubber composite reinforced with the textile material;
- then, during a second stage, crosslinking the composite thus formed by curing, preferably under pressure.

The invention thus applies to any type of rubber composite capable of being obtained by the process described above, comprising at least a matrix made of crosslinkable rubber composition, in particular diene rubber composition, bonded to the textile material via an adhesive interphase based on the adhesive composition according to the invention.

The diene elastomer of the composite is preferably selected from the group consisting of polybutadienes (BRs), natural rubber (NR), synthetic polyisoprenes (IRs), butadiene/styrene copolymers (SBRs), isoprene/butadiene copolymers (BIRs), isoprene/styrene copolymers (SIRs), butadiene/styrene/isoprene copolymers (SBIRs) and the mixtures of these elastomers. A preferred embodiment consists in using an "isoprene" elastomer, that is to say an isoprene homopolymer or copolymer, in other words a diene elastomer selected from the group consisting of natural rubber (NR), synthetic polyisoprenes (IRs), the various copolymers of isoprene and the mixtures of these elastomers. The isoprene elastomer is preferably natural rubber or a synthetic polyisoprene of the cis-1,4 type.

II.3—Application in Tyres

The textile material of the invention can advantageously be used to reinforce tyres for all types of vehicles, in particular passenger vehicles or industrial vehicles, such as heavy-duty vehicles.

By way of example, the single appended FIGURE represents very diagrammatically (without observing a specific scale) a radial section of a tyre in accordance with the invention for a vehicle of the passenger type.

This tyre 1 comprises a crown 2 reinforced by a crown reinforcement or belt 6, two sidewalls 3 and two beads 4, each of these beads 4 being reinforced with a bead thread 5. The crown 2 is surmounted by a tread, not represented in this diagrammatic FIGURE. A carcass reinforcement 7 is wound around the two bead threads 5 in each bead 4, the turn-up 8 of this reinforcement 7 being, for example, positioned towards the outside of the tyre 1, which is here represented fitted onto its wheel rim 9. The carcass reinforcement 7 is, in a way known per se, composed of at least one ply reinforced by "radial" cords, for example textile cords, that is to say that these cords are positioned virtually parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

This tyre 1 of the invention has, for example, the essential characteristic that at least a crown reinforcement 6 and/or its carcass reinforcement 7 comprises a textile material according to the invention. According to another possible implementational example of the invention, it is, for example, the bead threads 5 which might be composed, in all or in part, of a textile material according to the invention.

Of course, the invention relates to the objects described above, namely the textile material and the rubber composite, such as tyre, comprising it, both in the raw state (before curing or vulcanization) and in the cured state (after curing).

III—Examples of the Implementation of the Invention

III.1—Test 1: Adhesion of Polyamide Textile Cords

These tests demonstrate that the adhesion, to a diene elastomer composition, of polyamide textile cords sized with an aqueous adhesive composition according to the invention is equivalent, indeed even in some cases improved, in comparison with cords sized with a conventional adhesive composition of the RFL type.

For this, three aqueous adhesive compositions were prepared as indicated above, two in accordance with the invention (hereinafter denoted C-1.2 and C-1.3) and one not in accordance with the invention (control composition, hereinafter denoted C-1.1). Their formulations (expressed as percentage by weight) are presented in the appended Table 1. The amounts listed in this table are those of the constituents in the dry state, with respect to a total of 100 parts by weight of aqueous adhesive composition (that is to say, the constituents plus the water).

The adhesive composition C-1.1 is a control composition, of RFL type, commonly used for the adhesion of polyamide cords to a rubber composition. This adhesive composition is based on resorcinol and formaldehyde.

The aqueous adhesive compositions C-1.2 and C-1.3 according to the invention are both based on phloroglucinol and respectively on 1,4-benzenedicarboxaldehyde and 1,3-benzenedicarboxaldehyde.

These adhesive compositions C-1.1 to C-1.3 are furthermore all based on natural rubber (NR) latex, styrene/butadiene copolymer (SBR) latex and vinylpyridine/styrene/butadiene (VPSBR) latex.

The polyamide (polyamide-6,6) cords consist of folded yarns comprising two strands of 140×2 (count of each strand equal to 140 tex) and 250/250 (twist in t/m) construction; they were sized with each of these 3 aqueous adhesive compositions C-1.1 to C-1.3 and then dried in a drying oven at 180° C. for 60 s. Then, the adhesive composition was then crosslinked by passing the textile cords through a treatment oven at 230° C. for 60 s. The combination was then rendered integral with a natural rubber composition by virtue of a vulcanization heat treatment, in order to form composite test specimens as described below.

The quality of the bonding between the rubber composition and the textile material is subsequently determined by a test in which the force necessary to extract sections of cords made of textile material from the vulcanized rubber composition is measured. This rubber composition is a conventional composition which can be used for the calendering of tyre carcass reinforcement textile plies, based on natural rubber, carbon black and standard additives.

More specifically, the vulcanizate is a rubber block consisting of two sheets measuring 200 mm by 4.5 mm and with a thickness of 3.5 mm, applied against each other before curing (the thickness of the resulting block is then 7 mm). It is during the production of this block that the textile cords (15 sections in total) are imprisoned between the two rubber sheets in the raw state, an equal distance apart and while allowing a cord end to project out on either side of these sheets with a length sufficient for the subsequent tensile testing. The block comprising the cords is then placed in a suitable mould and then cured under pressure. The curing temperature and the curing time are adapted to the intended test conditions and left to the discretion of a person skilled in the art; by way of example, in the present case, the block is cured at 160° C. for 15 min.

On conclusion of the curing, the test specimen, thus consisting of the vulcanized block and the 15 sections of cords, is placed between the jaws of a suitable tensile testing machine in order to make it possible to test each section individually, at a given rate and a given temperature (for example, in the present case, at 100 mm/min and 20° C. or 120° C.).

The adhesion levels are characterized by measuring the "tearing-out" force (denoted by $F_{max}$) for tearing the reinforcers out of the test specimen. A value greater than that for the control test specimen, arbitrarily set at 100, indicates an improved result, that is to say, a greater tearing-out force than that for the control test specimen. The results of the tests carried out on the test specimens are summarized in Table 1.

It is found that the textile cords sized with the adhesive compositions C-1.2 and C-1.3 according to the invention exhibit a tearing-out force $F_{max}$ which is equivalent, indeed even slightly lower but significant and sufficient for a person skilled in the art, in comparison with the tearing-out force measured on the control textile cord sized with the conventional "RFL" adhesive.

III.2—Test 2: Adhesion of PET Cords

The aim of the tests which follow is to demonstrate the achievement of satisfactory adhesion between polyester (PET) cords sized with an aqueous adhesive composition according to the invention and a diene elastomer composition, in comparison with a control cord sized with a conventional adhesive composition of the RFL type.

In the case of PET cords, it is known to precoat them in a first bath generally based on epoxy in aqueous solution, for example based on polyglycerol polyglycidyl ether. The ingredients are introduced into the water with stirring, for example in the following order: 0.5 percent by weight of polyglycerol polyglycidyl ether (for example "Denacol EX-512" from Nagase Chemicals), 0.03 percent by weight of surfactant (dioctyl sodium sulphosuccinate, sold under the name "AOT 75"), 0.03 percent by weight of sodium hydroxide and 99.44 percent by weight of water.

The PET cords of these examples consist of folded yarns comprising two strands of 144×2 (count of each strand equal to 144 tex) and 420/420 (twist in t/m) construction; thus precoated, they are subsequently sized with aqueous adhesive compositions according to the invention and a control composition, and then dried in a drying oven at 140° C. for 30 s. The adhesive composition is then crosslinked by passing the textile cords through a treatment oven at 240° C. for 30 s. They were then rendered integral, by curing, with a natural rubber composition, as above for the polyamide cords, by virtue of a vulcanization heat treatment, in order to form composite test specimens.

For these tests, three aqueous adhesive compositions were prepared as indicated above, two in accordance with the invention (hereinafter denoted C-2.2 and C-2.3) and one not in accordance with the invention (control composition, hereinafter denoted C-2.1). Their formulations (expressed as percentage by weight) are presented in the appended Table 2. The amounts listed in this table are those of the constituents in the dry state, with respect to a total of 100 parts by weight of aqueous adhesive composition (that is to say, the constituents plus the water).

The adhesive composition C-2.1 is a control composition, of RFL type, based on resorcinol and formaldehyde, commonly used to make PET fibres adhere to a rubber composition.

The aqueous adhesive compositions C-2.2 and C-2.3 according to the invention are based on phloroglucinol and respectively on 1,4-benzenedicarboxaldehyde and 1,3-benzenedicarboxaldehyde.

As above, these adhesive compositions C-2.1 to C-2.3 are furthermore all based on NR, SBR and vinylpyridine/styrene/butadiene latexes.

The results of the adhesion tests (as described in the preceding section III.1) carried out on the test specimens respectively prepared with the adhesive compositions C-2.1 to C-2.3 are summarized in Table 2.

The tearing-out force ($F_{max}$) for the cords according to the invention sized with the adhesive compositions C-2.2 and C-2.3 according to the invention exhibits a value, both at 20° C. and at 120° C., close to that of the control cord sized with RFL (arbitrarily set at 100).

In conclusion, the results of these various tests clearly demonstrate that the aqueous adhesive compositions according to the invention constitute a highly advantageous alternative to the use of conventional "RFL" adhesives.

TABLE 1

| | Adhesive compositions | | |
|---|---|---|---|
| | C-1.1 | C-1.2 | C-1.3 |
| Aldehyde: | | | |
| Formaldehyde (1) | 0.9 | — | — |
| 1,3-Benzenedicarboxaldehyde (2) | — | — | 1.7 |
| 1,4-Benzenedicarboxaldehyde (3) | — | 1.7 | — |
| Polyphenol: | | | |
| Resorcinol (4) | 1.7 | — | — |
| Phloroglucinol (5) | — | 0.9 | 0.9 |
| Sodium hydroxide (6) | 0.2 | 0.2 | 0.2 |
| Elastomer latex: | | | |
| NR (7) | 6.4 | 6.4 | 6.4 |
| SBR (8) | 3.2 | 3.2 | 3.2 |
| VP-SBR (9) | 6.4 | 6.4 | 6.4 |
| Aqueous ammonia (10) | 0.5 | 0.5 | 0.5 |
| Total weight of dry matter of adhesive composition | 19.3 | 19.3 | 19.3 |
| Weight of water | 80.7 | 80.7 | 80.7 |
| Adhesion tests | | | |
| $F_{max}$ at 20° C. | 100 | 103 | 94 |
| $F_{max}$ at 120° C. | 100 | 100 | 85 |

(1) Formaldehyde (from Caldic; diluted to 36%);
(2) 1,3-Benzenedicarboxaldehyde (from ABCR; purity of 98%);
(3) 1,4-Benzenedicarboxaldehyde (from ABCR; purity of 98%);
(4) Resorcinol (from Sumitomo; purity of 99.5%);
(5) Phloroglucinol (from Alfa Aesar; purity of 99%);
(6) Sodium hydroxide (from Aldrich; diluted to 30%);
(7) NR Latex ("Trang Latex" from Bee tex; diluted to 61% by weight);
(8) SBR Latex ("Encord-201" from Jubilant; diluted to 41% by weight);
(9) Vinylpyridine/styrene/butadiene latex ("VP 106S" from Eliokem; diluted to 41%);
(10) Aqueous ammonia (from Aldrich; diluted to 21%).

TABLE 2

|  | Adhesive compositions | | |
|---|---|---|---|
|  | C-2.1 | C-2.2 | C-2.3 |
| Aldehyde: | | | |
| Formaldehyde (1) | 0.9 | — | — |
| 1,3-Benzenedicarboxaldehyde (2) | — | — | 1.7 |
| 1,4-Benzenedicarboxaldehyde (3) | — | 1.7 | — |
| Polyphenol: | | | |
| Resorcinol (4) | 1.7 | — | — |
| Phloroglucinol (5) | — | 0.9 | 0.9 |
| Sodium hydroxide (6) | 0.2 | 0.2 | 0.2 |
| Elastomer latex: | | | |
| NR (7) | 6.4 | 6.4 | 6.4 |
| SBR (8) | 3.2 | 3.2 | 3.2 |
| VP-SBR (9) | 6.4 | 6.4 | 6.4 |
| Aqueous ammonia (10) | 0.5 | 0.5 | 0.5 |
| Total weight of dry matter of adhesive composition | 19.3 | 19.3 | 19.3 |
| Weight of water | 80.7 | 80.7 | 80.7 |
| Adhesion tests | | | |
| $F_{max}$ at 20° C. | 100 | 101 | 94 |
| $F_{max}$ at 120° C. | 100 | 104 | 93 |

(1) Formaldehyde (from Caldic; diluted to 36%);
(2) 1,3-Benzenedicarboxaldehyde (from ABCR; purity of 98%);
(3) 1,4-Benzenedicarboxaldehyde (from ABCR; purity of 98%);
(4) Resorcinol (from Sumitomo; purity of 99.5%);
(5) Phloroglucinol (from Alfa Aesar; purity of 99%);
(6) Sodium hydroxide (from Aldrich; diluted to 30%);
(7) NR Latex ("Trang Latex" from Bee tex; diluted to 61% by weight);
(8) SBR Latex ("Encord-201" from Jubilant; diluted to 41% by weight);
(9) Vinylpyridine/styrene/butadiene latex ("VP 106S" from Eliokem; diluted to 41%);
(10) Aqueous ammonia (from Aldrich; diluted to 21%).

The invention claimed is:

1. An aqueous adhesive composition comprising:
a phenol/aldehyde resin; and
an unsaturated elastomer latex,
wherein the phenol/aldehyde resin is based on:
phloroglucinol, and
wherein the aldehyde in the phenol/aldehyde resin is an aromatic polyaldehyde bearing at least two aldehyde functional groups, the aromatic polyaldehyde including at least one aromatic nucleus.

2. The aqueous adhesive composition according to claim 1, wherein the at least one aromatic nucleus of the aromatic polyaldehyde is a benzene nucleus.

3. The aqueous adhesive composition according to claim 1, wherein the at least two aldehyde functional groups are borne by the at least one aromatic nucleus.

4. The aqueous adhesive composition according to claim 3, wherein the aromatic polyaldehyde is selected from a group consisting of 1,2-benzenedicarboxaldehyde, 1,3-benzenedicarboxaldehyde, 1,4-benzenedicarboxaldehyde, 2-hydroxybenzene-1,3,5-tricarbaldehyde, and mixtures thereof.

5. The aqueous adhesive composition according to claim 4, wherein the aromatic polyaldehyde is 1,4-benzenedicarboxaldehyde.

6. The aqueous adhesive composition according to claim 1, wherein the phenol/aldehyde resin includes a basic solvent.

7. The aqueous adhesive composition according to claim 6, wherein the basic solvent is an aqueous solution having a pH between 9 and 13.

8. The aqueous adhesive composition according to claim 1, wherein an unsaturated elastomer of the unsaturated elastomer latex is a diene elastomer selected from a group consisting of polybutadienes, butadiene copolymers, polyisoprenes, isoprene copolymers, vinylpyridine/styrene/butadiene terpolymers, and mixtures thereof.

9. The aqueous adhesive composition according to claim 1, wherein a ratio by weight of the phloroglucinol to the aromatic polyaldehyde is between 0.1 and 3.0.

10. The aqueous adhesive composition according to claim 1, wherein a content of the phenol/aldehyde resin as dry matter of the adhesive composition is between 5% and 60% by weight of the dry matter of the adhesive composition.

11. The aqueous adhesive composition according to claim 1, wherein a content of unsaturated elastomer as dry matter of the adhesive composition is between 40% and 95% by weight of the dry matter of the adhesive composition.

12. The aqueous adhesive composition according to claim 1, wherein a ratio by weight of dry matter corresponding to the phenol/aldehyde resin to dry matter corresponding to the unsaturated elastomer latex is between 0.1 and 2.0.

13. The aqueous adhesive composition according to claim 1, wherein a water content of the adhesive composition is between 60% and 90% by weight of the aqueous adhesive composition.

14. A textile material coated at least partially with an adhesive layer, the adhesive layer including an adhesive composition comprising:
a phenol/aldehyde resin; and
an unsaturated elastomer latex,
wherein the phenol/aldehyde resin is based on:
phloroglucinol, and
wherein the aldehyde in the phenol/aldehyde resin is an aromatic polyaldehyde bearing at least two aldehyde functional groups, the aromatic polyaldehyde including at least one aromatic nucleus.

15. The textile material according to claim 14, wherein the adhesive composition is an aqueous adhesive composition.

16. The textile material according to claim 14, wherein the textile material has been dried.

17. The textile material according to claim 14, wherein the textile material is a material selected from a group consisting of films, monofilaments, multifilament fibres, assemblies of monofilaments or multifilament fibres, and mixtures thereof.

18. The textile material according to claim 14, wherein the textile material is formed of a substance that includes a thermoplastic polymer.

19. The textile material according to claim 18, wherein the thermoplastic polymer is an aliphatic polyamide or a polyester.

20. A rubber composite reinforced with a textile material coated at least partially with an adhesive layer, the adhesive layer including an adhesive composition comprising:
a phenol/aldehyde resin; and
an unsaturated elastomer latex,
wherein the phenol/aldehyde resin is based on:
phloroglucinol, and
wherein the aldehyde in the phenol/aldehyde resin is an aromatic polyaldehyde bearing at least two aldehyde functional groups, the aromatic polyaldehyde including at least one aromatic nucleus.

21. The rubber composite according to claim 20, wherein the rubber composite is incorporated in a tire.

22. An adhesive composition comprising:
a phenol/aldehyde resin; and
an unsaturated elastomer latex,
wherein the phenol/aldehyde resin is based on:
phloroglucinol, and wherein the aldehyde in the phenol/aldehyde resin is an aromatic polyaldehyde bearing at least two aldehyde functional groups, the aromatic polyaldehyde including at least one aromatic nucleus.

23. The adhesive composition according to claim 22, wherein the adhesive composition is in an uncured state.

24. The adhesive composition according to claim 22, wherein the adhesive composition is in a cured state.

* * * * *